United States Patent Office.

ROBERT A. CHESEBROUGH, OF NEW YORK, N. Y.

IMPROVEMENT IN REFINING PETROLEUM BY FILTRATION.

Specification forming part of Letters Patent No. 51,558, dated December 19, 1865.

*To all whom it may concern:*

Be it known that I, ROBERT A. CHESEBROUGH, of the city of New York and State of New York, have discovered and invented the Use of Alumina for Purifying and Refining Petroleum by Filtration, of which the following is a specification.

My method of purifying and refining consists in first distilling the crude petroleum in a still with a condensing-worm such as is ordinarily used for distilling the same.

The products of distillation are benzole, illuminating-oil, and heavy oil, which I then filter, either separately or combined, as follows:

The material I use for filtering through is alumina, that exists naturally in various clays, and can be extracted from them, or it can be made by decomposing a solution of alum, bicarbonate of soda, or potash, the precipitate being alumina.

The filter is made of wood or iron, of any suitable form and height.

The filter is filled up with the alumina as high as may be necessary, according to the quality of the oil. The petroleum is run in on top of the filtering material and allowed to filter through the perforated bottom of the filter, when it is collected. The operation is continued by feeding the petroleum-oil into the top of the filter as fast as it runs through the filtering material, until the filtered oil shall begin to assume a dark color, when the operation is suspended and the filter replenished with fresh alumina.

The petroleum thus refined will be sweet in odor, of a light color, and will need no other treatment.

The crude petroleum from the wells may be purified in this manner without any previous distillation, either for purposes of illumination or lubrication.

What I claim as my invention, and desire to secure by Letters Patent, is—

The use of alumina and of substances containing alumina, either by itself or in combination with other substances, for purifying or refining petroleum by filtration.

ROBT. A. CHESEBROUGH.

Witnesses:
J. FRANKLIN REIGART,
EDM. F. BROWN.